United States Patent [19]

Fieuws et al.

[11] Patent Number: 5,370,919
[45] Date of Patent: Dec. 6, 1994

[54] FLUOROCHEMICAL WATER- AND OIL-REPELLANT TREATING COMPOSITIONS

[75] Inventors: Franceska Fieuws, Brugge; Kathy Allewaert, Heverlee; Dirk Coppens, Antwerpen, all of

[73] Assignee: Minnesota Mining and Manufacturing Company, St. Paul, Minn.

[21] Appl. No.: 973,227

[22] Filed: Nov. 6, 1992

Related U.S. Application Data

[63] Continuation of Ser. No. 728,111, Jul. 10, 1991, abandoned.

[51] Int. Cl.$^5$ ............................................. B32B 27/00
[52] U.S. Cl. ............................... 428/96; 428/263; 428/264; 428/270; 428/274; 428/361; 428/375; 428/421; 428/473; 428/537.5; 427/387; 427/389; 427/394; 427/396; 427/393.4; 106/2
[58] Field of Search ..................... 106/2; 252/86; 427/393.4, 387, 389, 394, 396, 397.4; 428/263, 264, 270, 274, 361, 375, 421, 473, 537.5

[56] References Cited

U.S. PATENT DOCUMENTS

| Re. 30,337 | 7/1980 | Loudas | 252/8.75 |
|---|---|---|---|
| 3,574,791 | 4/1971 | Sherman et al. | 260/884 |
| 3,654,244 | 4/1972 | Pittman et al. | 260/79.7 |
| 3,728,151 | 4/1973 | Sherman et al. | 117/138.8 |
| 3,748,268 | 7/1973 | Loudas | 252/90 |
| 3,787,351 | 1/1974 | Olson | 260/40 R |
| 3,816,167 | 6/1974 | Schultz et al. | 117/138.8 |
| 3,901,727 | 8/1975 | Loudas | 134/4 |
| 3,920,614 | 11/1975 | Kirimoto | 260/63 UY |
| 3,940,359 | 2/1976 | Chambers | 260/29.6 F |
| 4,043,964 | 8/1977 | Sherman et al. | 260/29.6 F |
| 4,107,055 | 8/1978 | Sukornick | 252/8.6 |
| 4,160,777 | 7/1979 | Loudas | 260/456 F |
| 4,264,484 | 4/1981 | Patel | 260/29.6 |
| 4,289,892 | 9/1981 | Soch | 560/26 |
| 4,419,298 | 12/1983 | Falk | 260/501.16 |
| 4,560,487 | 12/1985 | Brinkley | 252/8.9 |
| 4,668,726 | 5/1987 | Howells | 524/225 |
| 4,681,790 | 7/1987 | Fong | 428/96 |
| 4,788,287 | 11/1988 | Matsuo et al. | 544/196 |
| 4,792,354 | 12/1988 | Matsuo et al. | 106/2 |
| 4,795,793 | 1/1989 | Amimoto | 526/243 |
| 4,859,754 | 8/1989 | Maekawa et al. | 526/245 |

FOREIGN PATENT DOCUMENTS

| 0016658 | 10/1980 | European Pat. Off. . |
|---|---|---|
| 0195323 | 9/1986 | European Pat. Off. . |
| 0329899 | 8/1989 | European Pat. Off. . |

OTHER PUBLICATIONS

Sorenson & Campbell, "Preparative Methods of Polymer Cheistry", 2nd ed., Interscience Publishers (1968) pp. 72–154 and pp. 202–287.

*Primary Examiner*—Paul Lieberman
*Assistant Examiner*—Margaret Einsmann
*Attorney, Agent, or Firm*—Gary L. Griswold; Walter N. Kirn; Carole Truesdale

[57] ABSTRACT

This invention relates to a treating composition containing 0.3 to 30% by weight of a fluoroaliphatic radical containing poly(oxyalkylene) compound, 0.3 to 30% by weight of an anti-soiling agent and 0 to 60% by weight of an environmentally acceptable water-miscible organic solvent and water for the use for imparting excellent water- and oil repellency, stain resistance and dry soil resistance to textiles, carpets, concrete, paper, leather and wool.

11 Claims, No Drawings

FLUOROCHEMICAL WATER- AND OIL-REPELLANT TREATING COMPOSITIONS

This is a continuation of application Ser. No. 07/728,111 filed Jul. 10, 1991, now abandoned.

This invention relates to a treating composition containing a fluoroaliphatic radical and an anti-soiling agent for imparting water and oil repellency as well as soil resistance to textiles and other materials treated therewith.

Furthermore, the invention relates to a process for preparing the treating composition and to substrates treated with the treating composition.

The need for the removal of spots and stains from fabrics and carpets and a variety of other substrate surfaces is well known.

The treatment of textiles with fluorochemicals containing fluoroaliphatic radicals to impart water and oil repellency has been known for some time. For example U.S. Pat. No. 3,574,791 (Sherman and Smith) and U.S. Pat. No. 3,728,151 (Sherman and Smith disclose relatively high molecular weight materials which include block or graft copolymers, or block and graft copolymers, which have at least two different segments, one of which is highly fluorinated and oleophobic and the other of which is water solvatable or hydratable. The water solvatable or hydratable segment bears pluralities of structural units containing characteristic solvatable polar groups such as ether oxygen atoms. U.S. Pat. No. 3,816,167 (Schultz and Sherman) discloses applying a treatment of fluoroaliphatic comonomer and polyalkylene gylcol cross-linked in situ by an aldehyde-containing prepolymer to provide stain release to synthetic fibers during laundering. U.S. Pat. No. 4,043,964 (Sherman and Smith) discloses a coating which provides durably soil-resistant carpet which contains (a) at least one phase of a specified water-insoluble addition polymer derived from a polymerizable ethylenically unsaturated monomer free of non-vinylic fluorine and (b) at least one phase of a specified water-insoluble fluorinated component containing a fluoroaliphatic radical of at least 3 carbon atoms. The monomer from which the fluorinated component is formed may contain dicarboxylic acid, glycol, diamine, hydroxyamine, etc. U.S. Pat. No. 4,264,484 (Patel) discloses a liquid carpet treating composition containing a water-insoluble addition polymer derived from polymerizable ethylenically unsaturated monomer free of nonvinylic fluorine and having at least one major transition temperature higher than about 25° C. and a water-insoluble fluoroaliphatic radical- and aliphatic chlorine-containing ester having at least one major transition temperature higher than about 25° C. Such treating compositions, however, are mainly intended for mill treatment of the textile where treatment steps, such as heating are generally applied.

U.S. Pat. No. Re. 30,337 and U.S. Pat. No. 4,160,777 (Loudas) disclose compositions containing detergent compatible organic fluorochemical compounds and an anti-redeposition agent e.g. an ammonium salt of the hydrolyzed copolymer of styrene and maleic anhydride for imparting water and oil repellency and soil resistance to textiles and to detergent solutions containing such compositions for cleaning textiles simultaneously with imparting the water and oil repellency and soil resistance.

U.S. Pat. No. 3,654,244 (Pittman et al.) discloses polymers for providing both soil repellency and soil releasability to fibrous materials. The polymers are copolymerization products of at least two different monomers, one imparting oleophobic properties which is an acrylate or methacrylate which contains a terminal perfluoroalkyl group of 3 to 18 perfluorinated carbon atoms, and the other hydrophilic properties which is an acrylate or methacrylate of a specified hydrocarbon alcohol.

U.S. Pat. No. 3,787,351 (Olson) discloses oligomers which act as wetting agents in filled or reinforced synthetic resin composites, the oligomers having a plurality of fluoroaliphatic radicals linked to solubilizing poly(oxyalkylene) moieties.

U.S. Pat. No. 3,920,614 (Kirimoto et al.) discloses an oil- and water-repellent copolymer having high soil release properties which is prepared by copolymerizing at least 25 weight percent of a polymerizable fluoroalkyl monomer and 5–50 weight percent of a polymerizable acrylate or methacrylate containing poly(oxyethylene) units. The copolymer may optionally contain co-monomer and/or a acrylonitrile or methacrylonitrile.

U.S. Pat. No. 4,289,892 (Soch) discloses preparing rigid or flexible polyurethane foams with high or low density and uniform cellular structure using fluoroaliphatic radical-substituted poly(oxyalkylene) polyols as foam stabilizers.

U.S. Pat. No. 4,859,754 (Maekawa et al.) discloses a water and oil repellent having desoiling properties composed of a polyfluorinated group-containing copolymer obtained by copolymerizing a polyfluorinated group-containing monomer which can be an acrylate or methacrylate and an amphipathic monomer having a hydrophilic moiety and a lipophilic moiety which can have as the hydrophilic moiety a polyoxyalkylene chain.

U.S. Patent No. 4,795,793 (Amimoto et al.) discloses fluorine-containing copolymers comprising 30 to 90% by weight of the constituting unit derived from (a) a polymerizable compound having a perfluoroalkyl group of 4 to 20 carbon atoms, 10 to 59% by weight of the constituting unit derived from (b) cyclohexyl or benzyl ester of acrylic acid or methacrylic acid and 0.1 to 10% by weight of the constituting unit derived from (c) at least one selected from the group consisting of polyethylene glycol diacrylate and N-methylolacrylamide.

U.S. Pat. No. 3,748,268 (Loudas) describes a stable one-phase composition which is useful as a spot and stain remover comprising a hydrocarbon solvent of low volatility, water, surfactant, organic co-solvent and an anti-soiling agent. As organic co--solvents are used chlorinated alkylenes like trichloroethylene or perchloroethylene or aromatic hydrocarbons like benzene, toluene and xylene. Useful anti-soiling agents include brittle polymeric resins, such as styrene-maleic anhydride copolymers, colloidal alumina, colloidal suspensions of silica, polyvinylpyrollidone, polyacrylate/acrylic acid copolymers, vinyl acetate/maleic anhydride copolymers, carboxymethylcellulose, carboxyl-containing resins and water-soluble melamineformaldehyde condensates.

U.S. Pat. No. 3,901,727 (Loudas) discloses a container-stable, water-dilutable alkaline cleaning composition which has, in an aqueous medium (a) a water-dispersible detergent which is capable of drying to a non-oily, non-tacky residue, (b) a water-dispersible organic carboxyl-containing material which can be the ammonium salts of styrene-maleic anhydride copolymers, a water-dispersible Lewis base, (d) a zinc or zirconium coordination complex, (e) a fluorochemical compound which is water-dispersible at or about about pH 8, has acid functionality and forms zinc or zirconium salts which are capable of imparting water and oil repellency.

U.S. Pat. No. 4,419,298 (Falk) discloses ammonium and amine salts of acids having gem-di-perfluoroalkyl groups useful for providing oil and water repellency to cellulosic and polyamide materials. Styrene/maleic anhydride polymers are disclosed as sizing agents useful in aqueous emulsions for topical application which contain the ammonium or amine salts of the gem-di-perfluoroalkyl group containing acids.

U.S. Pat. No. 4,107,055 (Sukornick) describes a fabric coating composition including a polymer having a glass transition temperature above room temperature such as a styrene/maleic anyhdride copolymer, an ionic non-polymeric fluorinated surfactant and a carrier.

U.S. Pat. No. 4,681,790 (Fong) describes a treating composition to impart water- and oil repellency as well as soil resistance containing fluorochemical compound A, a fluorochemical compound known to have utility with surfactants and/or detergents for providing oil and water repellency, and fluorochemical compound B, a fluoroaliphatic radical-containing poly(oxyalkylene), and an organic water-miscible solvent.

U.S. Pat. No. 4,668,726 (Howells) describes a blend of the mixture of a cationic and nonionic fluorochemical, a fluorochemical poly(oxyalkylene) and/or a hydrocarbon non-ionic surfactant.

U.S. Pat. No. 4,788,287 and U.S. Pat. No. 4,792,354 (Matsuo et al.) disclose a water and oil repellent compound having at least two terminal segments and an intermediate segment connecting the terminal segments and having a molecular weight of from 800 to 20,000, each terminal segment containing at least one polyfluoroalkyl group connected by a —CONH— linking group, the intermediate segment being a urethane oligomer containing at least two —CONH— linking groups in one molecule, and said terminal segments and intermediate segment being connected by a —CONH— linking group. The urethane oligomer of Matsuo et al. '354 further contains a hydrophilic molecular chain.

The above references disclose fluorochemical compounds or treating compositions which may be applied to textiles. These known fluorochemical treating agents have the disadvantage that they contain chlorinated solvents which are no longer acceptable from a toxicological and environmental standpoint. Those treatment agents which do not contain chlorinated solvents and which are environmentally more acceptable have insufficient water and oil repellent properties.

The present invention provides, in one aspect, an aqueous treating composition for providing water-, oil- and stain repellency and dry-soil resistance to fibrous materials without the need for thermal cure, said composition comprising a) 0.3 to 30% by weight of a water soluble or dispersible fluoroaliphatic radical-containing poly(oxyalkylene) compound, or a composition comprising a mixture of such poly(oxyalkylene) compounds having one or more monovalent fluoroaliphatic radicals and one or more poly(oxyalkylene) moieties, said fluoroaliphatic radicals and poly(oxyalkylene) moieties being bonded together by hetero atom-containing groups or organic linking groups or combinations of such groups; and b) 0.3 to 30% by weight of solid, non-tacky, water-soluble or water dispersible anti-soiling agent which, upon drying of the composition, is capable of rendering the substrate non-tacky and resistant to soiling; and c) water, with the proviso that the ratio of component (a) to component (b) be 1:20 to 20:1. The compositions may optionally contain up to 60% by weight of at least one environmentally acceptable water-miscible organic solvent.

The fluoroaliphatic radical-containing poly(oxyalkylene) compound can be a fluoroaliphatic oligomer or polymer (the term oligomer hereinafter including polymer unless otherwise indicated) presented by the general formula:

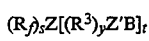

$$(R_f)_sZ[(R^3)_yZ'B]_t \qquad \text{II}$$

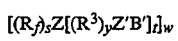

$$[(R_f)_sZ[(R^3)_yZ'B']_t]_w \qquad \text{III}$$

where $R_f$ is a fluoroaliphatic radical, is a linkage through which $R_f$ and $(R^3)_y$ moieties are covalently bonded together, $(R^3)_y$ is a poly(oxyalkylene) moiety, $R^3$ being an oxyalkylene group with 2 to 4 carbon atoms and y is an integer (where the above formulas are those of individual compounds) or a number (where the above formulas are those of mixtures) at least 4, preferably 15 to 125 and can be as high as 180 or higher, B is a hydrogen atom or a monovalent terminal organic radical, B' is B or a valence bond, with the proviso that at least one B' is a valence bond interconnecting a Z-bonded $R^3$ radical to another Z, Z' is a linkage through which B, or B', and $R^3$ are covalently bonded together, s is an integer or number of at least 1 and can be as high as 25 or higher, t is an integer or number of at least 1, and can be as high as 60 or higher, and w is an integer or number greater than 1, and can be as high as 30 or higher.

In formulas II and III, where there were a plurality of $R_f$ radicals, they are either the same or different. This also applies to a plurality of Z, Z', $R^3$, B, B', and, in formula III, a plurality of s, y and t.

$R_f$ is a stable, inert, nonpolar, preferably saturated monovalent moiety which is both oleophobic and hydrophobic. A fluorinated oligomer preferably comprises from 2 to about 25 $R_f$ groups and preferably comprises about 5 percent to about 30 percent, and more preferably about 8 percent to about 20 percent fluorine by weight based on the total weight of the oligomer, the loci of the fluorine being essentially in the $R_f$ groups. $R_f$ preferably contains at least about 3 carbon atoms, more preferably 3 to about 20 carbon atoms, and most preferably about 6 to about 12 carbon atoms. $R_f$ can contain straight chain, branched chain, or cyclic alkyl groups. $R_f$ is preferably free of polymerizable olefinic unsaturation and can optionally contain catenary heteroatoms such as oxygen, divalent or hexavalent sulfur, or nitrogen. It is preferred that each $R_f$ contain about 40% to about 78% fluorine by weight, more preferably about 50% to about 78% fluorine by weight. The terminal portion of the $R_f$ group contains a fully fluorinated terminal group. This terminal group preferably contains at least 7 fluorine atoms, e.g., $CF_3CF_2CF_2$, $(CF_3)_2CF$, $CF_2SF_5$, or the like. Perfluorinated aliphatic groups, i.e., those of the formula $C_nF_{2n+1}$, are the most preferred embodiments of $R_f$.

Generally, the oligomers will contain about 5 to 40 weight percent, preferably about 10 to 30 weight percent, of carbon-bonded fluorine. If the fluorine content is less than about 10 weight percent, impractical large amounts of the oligomer will generally be required, while fluorine contents greater than about 35 weight percent result in oligomers which have too low a solubility to be efficient.

In the poly(oxyalkylene) radical, $(R^3)_y$, $R^3$ is an oxyalkylene group having 2 to 4 carbon atoms, such as —OCH$_2$CH$_2$—, —OCH$_2$CH$_2$CH$_2$—, —OCH(CH$_3$)CH$_2$—, and —OCH(CH$_3$)CH(CH$_3$)—, the oxyalkylene units in said poly(oxyalkylene) being the same, as in poly(oxypropylene), or present as a mixture, as in a heteric straight or branched chain or randomly distributed oxyethylene and oxypropylene units or as in a straight or branched chain of blocks of oxyethylene units and blocks of oxypropylene units. The poly(oxyalkylene) chain can be interrupted by or include one or more catenary linkages. Where said catenary linkages have three or more valences, they provide a means for obtaining a branched chain of blocks of oxyalkylene units. The poly(oxyalkylene) radicals in the oligomers can be the same or different, and they can be pendent. The molecular weight of the poly(oxyalkylene) radical can be about 500 to 2,500 and higher, e.g., 100,000 to 200,000 or higher.

The function of the linkages Z and Z' is to covalently bond the fluoroaliphatic radicals, $R_f$, the poly(oxyalkylene) moieties, $(R^3)_y$ and radicals B and B' together in the oligomer. Z and Z' can be a valence bond, for example, where a carbon atom of a fluoroaliphatic radical is bonded or linked directly to a carbon atom of the poly(oxyalkylene) moiety. Z and Z' each can also comprise one or more linking groups such as polyvalent aliphatic and polyvalent aromatic, oxy, thio, carbonyl, sulfone, sulfoxy, phosphoxy, amine, and combinations thereof, such as oxyalkylene, iminoalkylene, iminoarylene, sulfonamido, carbonamido, sulfonamidoalkylene, carbonamidoalkylene, urethane, urea, and ester. The linkages Z and Z' for a specific oligomer will be dictated by the ease of preparation of such an oligomer and the availability of necessary precursors thereof.

Illustrative linking groups Z are alkylene groups, such as ethylene, isobutylene, hexylene, and methylenedicyclohexylene, having 2 to about 20 carbon atoms, aralkylene groups, such as —CH$_2$C$_6$H$_4$CH$_2$— and —C$_6$H$_4$CH$_2$C$_6$H$_4$—, having up to 20 carbon atoms, arylene groups, such as tolylene, —C$_6$H$_3$(CH$_3$)—, poly(oxyalkylene) groups, such as —(C$_2$H$_4$O)$_y$C$_2$H$_4$— where y is 1 to about 5, and various combinations of these groups. Such groups can also include other hetero moieties (besides —O—), including —S— and —N—. However, Z is preferably free of groups with active hydrogen atoms.

From the above description of Z and Z' it is apparent that these linkages can have a wide variety of structures, and in fact where either is a valence bond, it does not even exist as a structure. However large Z or Z' is, the fluorine content (the locus of which is $R_f$) is in the aforementioned limits set forth in the above description, and in general the total Z and Z' content of the oligomer is preferably less than 10 weight percent of the oligomer.

The monovalent terminal organic radical, B, is one which is covalently bonded through Z', to the poly(oxyalkylene) radical.

Though the nature of B can vary, it preferably is such that it complements the poly(oxyalkylene) moiety in maintaining or establishing the desired solubility of the oxyalkylene- The radical B can be a hydrogen atom, acyl, such as C$_6$H$_5$C(O)—, alkyl, preferably lower alkyl, such as methyl, hydroxyethyl, hydroxypropyl, mercaptoethyl and aminoethyl, or aryl, such as phenyl, chlorophenyl, methoxyphenyl, nonylphenyl, hydroxyphenyl, and aminophenyl. Generally, Z'B will be less than 50 weight percent of the $(R^3)_yZ'B$ moiety.

The fluoroaliphatic radical-containing oxyalkylene polyurethanes used in this invention can be prepared by a variety of known methods, such as by condensation, free radical, or ionic homopolymerization or copolymerization using solution, suspension, or bulk polymerization techniques, e.g., see "Preparative Methods of Polymer Chemistry", Sorenson and Campbell, 2nd ed., Interscience Publishers.

The polyacrylates are a particularly useful class of oxyalkylenes and they can be prepared, for example, by free radical initiated copolymerization of a fluoroaliphatic radical-containing acrylate with a poly(oxyalkylene) acrylate, e.g., monoacrylate or diacrylate or mixtures thereof. As an example, a fluoroaliphatic acrylate, $R_f$—R''—O$_2$C—CH=CH$_2$ (where R'' is, for example, sulfonamido alkylene, carbonamidoalkylene, or alkylene), e.g., C$_8$F$_{17}$SO$_2$N(C$_4$H$_9$)CH$_2$CH$_2$O$_2$CCH=CH$_2$, can be copolymerized with a poly(oxyalkylene) monoacrylate, CH$_2$=CHC(O)(R$^3$)$_x$OCH$_3$, to produce a polyacrylate oxyalkylene.

Further description of fluoroaliphatic radical-containing poly(oxyalkylene) compounds useful in this invention and their preparation are known from U.S. Pat. No. 3,787,351 (Olson), U.S. Pat. No. 4,289,892 (Soch), U.S. Pat. No. 3,654,244 (Pittman et al.), U.S. Pat. No. 3,920,614 (Kirimoto et al.), U.S. Pat. No. 4,681,790 (Fong), U.S. Pat. No. 4,795,793 (Animoto et al.), U.S. Pat. No. 4,859,754 (Maekawa et al.) and U.S. Pat. No. 4,792,354 (Matsuo et al.), which are incorporated herein by reference.

In a preferred embodiment of the invention the fluoroaliphatic radical-containing poly(oxyalkylene) compound contains a fluoroalkyl radical having 3 to 20 carbon atoms, wherein perfluoroalkyl radicals are particularly preferred.

In a further preferred embodiment the poly(oxyalkylene) compound can contain 4 to 180, preferably 15 to 125, ethylene and/or propylene radicals.

The most preferred compound of the fluoroaliphatic radical-containing poly(oxyalkylene) compound is a poly(oxyalkylene) copolymer of
(a) C$_8$F$_{17}$SO$_2$N(CH$_3$)C$_2$H$_4$OCOCH=CH$_2$
(b) CH$_2$=C(CH$_3$)COO(CH$_2$CH$_2$O)$_{90}$H
(c) CH$_2$=C(CH$_3$)COO(CH$_2$CH$_2$O)$_{90}$COC(CH$_3$)=CH$_2$ preferably in a 1 : 1 weight ratio of a : (b+c) and a 3 : 1 weight ratio of b : c.

The anti-soiling agents are defined as those materials which are solid, non-tacky water soluble or water dispersible and which upon drying of the composition are capable of rendering the substrate non-tacky and resistant to soiling. Also mixtures of the anti-soiling agents can be used.

Useful anti-soiling agents include colloidal alumina (e.g. CATAPAL and DISPAL aluminas available from Vista Chemical Company), colloidal suspensions of silica (e.g. NALCO silicas available from Nalco Chemical Company brittle polymeric resins such as styrene-maleic anhydride copolymers and salts thereof (e.g. SMA TM Resins available from Atochem), polyvinylpyrrolidone, polyacrylate/acrylic acid copolymers (e.g. Rhoplex TM resins available from Rohm and Haas), vinyl acetate/maleic anhydride copolymers (e.g. VAMA resins available from Monsanto), carboxymethylcellulose, carboxyl-containing resins (e.g. Carboset TM resins from B. F. Goodrich) and water-soluble melamine formaldehyde condensates.

The preferred compounds are styrene/maleic anhydride resin salts, which are low molecular weight copolymers of styrene and maleic anhydride. Styrene/maleic anhydride resin salts are readily hydrolyzed in aqueous ammonia and used as such as anti-soiling agents.

The typical chemical structure of the aqueous solutions is as follows:

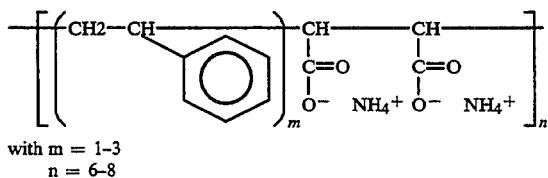

with m = 1–3
n = 6–8

These products are commercially available from Atochem as SMA TM - resins.

The environmentally acceptable water-miscible organic solvents, if used, preferably have low toxicity, e.g. the solvents are preferably classified in Germany according to class II or class III of the German emission control regulation (TA-Luft).

The organic solvent, if used, preferably has an adequate rate of evaporation which is lower than 2,000 with diethylether having 1 to permit removal after application.

Useful organic solvents are those which are at least partially water-miscible such as alcohols, water-miscible ethers (e.g. diethylene glycol diethylether, diethylene glycol dimethylether, propylene glycol dimethylether), water-miscible glycol ether (e.g. propylene glycol monomethylether, propylene glycol mono ethylether, propylene glycol monopropylether, propylene glycol monobutylether, ethylene glycol monobutylether, dipropylene glycol monomethylether, diethyleneglycol monobutylether), lower esters of monoalkylethers of ethyleneglycol or propylene glycol (e.g. propylene glycol monomethyl ether acetate) all commercially available from Union Carbide, Dow Chemicals or Hoechst. Mixtures of organic solvents can also be used.

Furthermore, the treating compositions according to the invention may contain other ingredients which increase effectiveness or improve physical appearance. For example, these compositions may contain ingredients which make the compositions more suitable for use and less susceptible to degradation or alteration. Such ingredients include corrosion inhibitors such as sodium nitrite and/or morpholine to inhibit storage and/or shipping container corrosion, a chelating agent such as that available under the trade designation Versenol TM 120 to inhibit metallic contamination caused by leaching of the storage container wall during long term storage.

Minor amounts of additives such as about 1% by weight of 3,5-dimethyl-i-hexyne-3-ol available under the trade designation Sulfonyl 61, n-pentanol, or cyclohexanol to stabilize the composition to improve shelf-life and prevent precipitation and sedimentation. Other ingredients such as fragrances, germicidal materials, defoamers and the like may also be added.

The viscosity of the novel composition can be modified over a wide range by addition of various common thickeners, e.g. carboxymethyl cellulose thickeners, hydroxypropylmethyl cellulose thickeners, acrylate thickeners.

Substrates which can be treated in accordance with this invention are textile fibers or filaments, and finished or fabricated fibrous articles such as textiles, carpet, paper, paperboard, leather and the like. The textiles include those made of natural fibers, such as cotton and wool and those made of synthetic organic fibers, such as nylon, polyolefin, acetate, rayon, acrylic and polyester fibers.

The treatment composition according to the invention can be conveniently applied to a fibrous substrates and other surfaces by spraying, dipping, coating, padding, foam or roller coating application, or by a combination of two or more of these methods. The treatment composition is used for imparting excellent water- and oil repellency, stain resistance and dry soil resistance to textiles, carpets, concrete, paper, leather and wood.

The invention is further illustrated by the following examples wherein all parts are parts by weight unless otherwise indicated.

The starting materials used in the examples were prepared as follows a) fluoroaliphatic radical-containing poly(oxyalkylene) compound (Component A), was prepared by mixing together the following ingredients in the following portions

| Parts by weight | Ingredient |
|---|---|
| 30 | hybrid copolymer of equal parts of A and B monomers (A) $C_8F_{17}SO_2N(CH_3)C_2H_4OCOCH=CH_2$; and (B) methacrylate esters of a polyethylene glycol of molecular weight of about 4,000 (Carbowax 4,000) comprising (a) $CH_2=C(CH_3)COO(CH_2CH_2O)_{90}H$ and (b) $CH_2=C(CH_3)COO(CH_2CH_2O)_{90}$—$COC(CH_3)=CH_2$ in a ratio of a:b of about 3:1. |
| 7 | Polyethylene glycol having a molecular weight of about 4,000 Carbowax 4,000) |
| 55 | Water |
| 7 | Ethylene glycol |
| 1 | Ethyl acetate | b) Anti-soiling agent

Procedure for preparing a 15% solids solution of anti-soiling agent, Component B:

Charge vessel with 533 g water and add 100 g styrene maleic anhydride copolymer (SMA 3000, commercially available from Atochem Inc.) while maintaining vigorous stirring.

Slowly add ammonium hydroxide (28%) 34 g, a slight exotherm occurs.

Heat to 70°-75° C. maintain temperature and agitation until solution is complete.

After cooling to room temperature, a slightly yellow viscous solution of pH 8.5-9.3 containing approximately 15% active anti-soiling agent is obtained.

The example according to the present invention and the comparative examples were used on test fabric samples which were evaluated for water- and oil repellency also a spray rating test, an abrasion resistance test and a dry soil test were performed. The test fabric samples are further described in the following table:

| Substrate | Weight/m$^2$ | Pile height |
|---|---|---|
| Cotton/Viscose (50/50) | 280 g | |
| Gobelin*I (100% Cotton) | 326 g | |
| Gobelin*II (100% Cotton) | 320 g | |
| Cotton-flat (100% Cotton) | 166 g | |
| Cotton-pile (100% Cotton) | 565 g | ±1 mm |
| Wool (100%) | 520 g | |
| Acrylic (100%) | 510 g | ±2 mm |
| Polyester (100%) | 229 g | |
| Viscose (100%) | 335 g | ±0.5 mm |
| Cotton/Acrylic (60/40) | 310 g | |
| Cotton/Polyester (65/35) | 277 g | |

* Gobelin = woven cotton upholstery fabric.

The test methods are described as follows:

A. Water Repellency test (WR)

The aqueous stain or water repellency of treated samples is measured using a water/isopropyl alcohol test, and the result is expressed in terms of a water repellency rating of the treated fabric. Treated fabrics which are penetrated by or resistant only to a 100 percent water/zero percent isopropyl alcohol mixture (the least penetrating of the test mixtures) are given a rating of 0, whereas treated fabrics resistant to zero percent water/100 percent isopropyl alcohol mixture (the most penetrating of the test mixtures) are given a rating of 10. Other intermediate values are determined by use of other water/isopropyl alcohol mixtures, in which the percentage amounts of water and isopropyl alcohol are each multiples of 10. Results are reported as an average of replicate testing. The water repellency rating corresponds to the most penetrating mixture which does not penetrate or wet the fabric after 30 seconds contact.

B. Oil Repellency test (OR)

The oil repellency of treated carpet and textile samples is measured by the American Association of Textile Chemists and Colorists (AATCC) Standard Test Method No. 118-1983, which test is based on the resistance of treated fabric to penetration by oils of varying surface tensions. Treated fabrics resistant only to Nujol TM, a brand of mineral oil and the least penetrating of the test oils, are given a rating of 1, whereas treated fabrics resistant to heptane (the most penetrating of the test oils) are given a value of 8. Other intermediate values are determined by use of other pure oils or mixtures of oils, as shown in the following table:

| Standard Test Liquids | |
|---|---|
| AATCC OIL Repellency Rating Number | Composition |
| 1 | Nujol TM |
| 2 | 65:35 Nujol TM :hexadecane by volume 70° F. (21° C.) |
| 3 | n-hexadecane |
| 4 | n-tetradecane |
| 5 | n-dodecane |
| 6 | n-decane |
| 7 | n-octane |
| 8 | n-heptane |

The rated oil repellency corresponds to the most penetrating oil (or mixture of oils) which does not penetrate or wet the fabric after 30 seconds contacts. Higher numbers indicate better oil repellency.

C. Spray Rating test (SR)

The spray rating, i.e., resistance of a treated substrate to wetting with water, was measured using AATCC Test Method 22 - 1977, "Water Repellency : Spray Test" as described in American Association of Textile Chemists and Colorists and Colorists Technical Manual, 1977, 53, 245. Samples are rated on a scale of 0 to 100, with 0 indicating complete wetting of the upper and lower surfaces of the substrate and with 100 indicating no wetting.

D. Accelerated Dry Soil test (ADS)

This accelerated dry soil test measures the tendency of a fabric to resist dry soil during use. A total of four samples, sized 14 cm × 17 cm are soiled in an accelerated soil tester, filled with sixty felt cubes (1.5 cm sides), using a 3M standard carpet dry soil (commercially available from 3M Company) during a ten minutes run. After removal of the samples from the soil tester, the excess soil is removed by blowing with compressed air. Evaluations are made by comparing to a 3M Soil Resistance Rating Board (available from 3M Company) in an "Evaluation Area" (reference AATCC Test Method 124-1984) with an "Overhead Lighting Arrangement" as indicated in AATCC Test Method 124-1984, Section 4.3 and FIG. 1 is recommended.

A dry soil rating of 5 indicates that there is no increase in soiling versus a blank, a dry soil rating of 1 refers to severe soiling.

E. Abrasion Oil Repellency (AOR)

This test measures the durable effectiveness of a protective fluorochemical finish by evaluating its resistance to abrasion and wear. It provides a simple, rapid method to measure the oil repellency of the finish after a specified abrasion method.

The durable effectiveness of a fluorochemical treatment to abrasion and wear is measured by abrading 5 cm × 12.5 cm samples of fabric back and forth 20 times by making 10 turns of the crank at the rate of 1 turn per second with WETODRY TRI-M-ITE TM Abrasive paper no. 600 (commercially available from 3M Company) on an AATCC crockmeter Model CM-1 (available from Atlas Electric Devices Co.). The above described OR repellency test is performed on the abraded samples and the repellency ratings recorded as AOR values.

F. Stain Release Test

The staining agents were left on the fabric for 5 minutes, blotted off with a dry paper towel, then cleaned with diluted household detergent (brushed) rinsed with pure water (brushed) and dried at room temperature. The remaining stain was evaluated for its intensity with the 3M stain release rating scale (1=severe stain, 8=no stain).

G. "Walk on" Test (WOS)

In this test, specimens of textile and selected control samples were exposed to normal foot traffic in a controlled test area. The test specimens and controls were removed at predetermined intervals corresponding to different degrees of soiling or exposure to soiling. Rating of these test results is similar to that described in the Accelerated Soiling Test method.

The invention is further illustrated by the following examples wherein all parts are parts by weight unless or otherwise indicated in the examples.

EXAMPLES 0–8

Composition according to the invention are described in Table I, the amounts of Components A and B being those of the solutions prepared above. The organic solvents listed in Table I are identified as follows:
BC : Ethyleneglycolmonobutylether
PnP: Propyleneglycol mono-n-propylether
DPM: Dipropyleneglycol monomethylether
PnB: Propyleneglycol mono-n-butylether
PM : Propyleneglycol monomethylether
PE : Propyleneglycol monoethylether
DMM: Propyleneglycol dimethylether
IPA: Isopropanol

TABLE I

| Ex. No. | Component A Fluoro-chemical | Component B Anti-soil resin | Organic Solvent * | Water |
|---|---|---|---|---|
| 0 | 5.8 | 5 | — | 89.2 |
| 1 | 5.8 | 5 | 25 BC | 64.2 |
| 2 | 5.8 | 5 | 25 PnP | 64.2 |
| 3 | 5.8 | 5 | 50 DPM | 39.2 |
| 4 | 5.8 | 5 | 25 DPM 15 PnB | 49.2 |
| 5 | 5.8 | 5 | 25 PM 10 PnB | 54.2 |
| 6 | 5.8 | 5 | 22.5 PE 7.5 PnB | 59.2 |
| 7 | 5.8 | 5 | 10 BC 25 DMM | 54.2 |
| 8 | 5.8 | 5 | 44.6 IPA | 44.6 |

These solutions were sprayed onto cotton-flat, cotton pile and wool fabric test samples at approximately 50% wet pick up, and were left to dry for 24 hrs at ambient temperature before the samples were tested. Oil repellency, water repellency, spray rating, abrasion oil repellency and accelerated dry soiling were evaluated on the cotton-flat, cotton-pile and wool fabrics, the results being set forth in Tables IIa, IIb and IIc, respectively.

TABLE IIa

| | (Cotton-flat) | | | | |
|---|---|---|---|---|---|
| Example | OR | WR | SR | AOR | ADS |
| 0 | 6 | 8 | 50 | 5 | 2.5 |
| 1 | 6 | 10 | 70 | 5 | 2.5 |
| 2 | 5 | 7 | 50 | 4 | 2 |
| 3 | 6 | 10 | 70 | 6 | 3 |
| 4 | 6 | 9 | 70 | 4 | 2.5 |
| 5 | 5 | 8 | 70 | 5 | 2.5 |
| 6 | 6 | 8 | 50 | 5 | 4 |
| 7 | 3 | 9 | 50 | 3 | 4 |
| 8 | 5 | 5 | 50 | 4 | 4 |

TABLE IIb

| | (Cotton-pile) | | | | |
|---|---|---|---|---|---|
| Example | OR | WR | SR | AOR | ADS |
| 0 | 4 | 8 | 70 | 4 | 2 |
| 1 | 4 | 4 | 70 | 3 | 2.5 |
| 2 | 4 | 2 | 70 | 2 | 2 |
| 3 | 4 | 2 | 50 | 3 | 4 |
| 4 | 3 | 2 | 70 | 2 | 2.5 |
| 5 | 4 | 2 | 70 | 4 | 3 |
| 6 | 5 | 4 | 70 | 4 | 3 |
| 7 | 0 | 2 | 70 | 0 | 3.5 |
| 8 | 3 | 2 | 70 | 2 | 3.5 |

TABLE IIc

| | (Wool) | | | | |
|---|---|---|---|---|---|
| Example | OR | WR | SR | AOR | ADS |
| 0 | 3 | 1 | 50 | 1 | 2.5 |
| 1 | 6 | 3 | 70 | 3 | 2 |
| 2 | 5 | 1 | 70 | 1 | 2 |
| 3 | 6 | 4 | 75 | 5+ | 3 |
| 4 | 4 | 3 | 70 | 1 | 2 |
| 5 | 5 | 2 | 70– | 1 | 1 |
| 6 | 6 | 3 | 70 | 5 | 2 |
| 7 | 4 | 4 | 75 | 3 | 3 |
| 8 | 4+ | 3 | 70 | 0 | 3 |

EXAMPLES 9–13

In the following examples, the ratios of fluoropolymer (Component A) to anti-soil agent (Component B) are varied as shown in Table III.

TABLE III

| Ex. No. | Component A | Component B | Organic Solvent | Water |
|---|---|---|---|---|
| 9 | 2.50 | 11.67 | 10 PnB/25 PM | 50.83 |
| 10 | 3.33 | 10.0 | 10 PnB/25 PM | 51.6 |
| 11 | 4.16 | 8.33 | 10 PnB/25 PM | 52.5 |
| 12 | 5.00 | 6.67 | 10 PnB/25 PM | 53.3 |
| 13 | 6.67 | 3.33 | 10 PnB/25 PM | 55.0 |

These solutions were sprayed onto the different fabric test samples, dried at ambient temperature and tested as in Examples 1–8. Performance results on the cotton-flat, cotton-pile and wool fabrics are set forth in Table IVa, IVb and IVc.

TABLE IVa

| | (Cotton-flat) | | | | |
|---|---|---|---|---|---|
| Example | OR | WR | SR | AOR | ADS |
| 9 | 3 | 4 | 50 | 2 | 3 |
| 10 | 4 | 8 | 50 | 2+ | 3 |
| 11 | 4 | 9 | 50 | 3 | 2.5 |
| 12 | 5 | 9 | 50 | 4 | 2.5 |
| 13 | 5 | 9 | 50 | 5 | 2.5 |

TABLE IVb

| | (Cotton-pile) | | | | |
|---|---|---|---|---|---|
| Example | OR | WR | SR | AOR | ADS |
| 9 | 3– | 1 | 70 | 1 | 4 |
| 10 | 4 | 2 | 70 | 1 | 4 |
| 11 | 4 | 2 | 70 | 3 | 3.5 |
| 12 | 4 | 2+ | 70 | 4 | 2.5 |
| 13 | 5 | 4– | 75 | 4 | 2.5 |

TABLE IVc

| Example | OR | (Wool) WR | SR | AOR | ADS |
|---|---|---|---|---|---|
| 9 | 4 | 1 | 50 | 0 | 2.5 |
| 10 | 5 | 2 | 70 | 1 | 2 |
| 11 | 4+ | 3 | 70 | 1 | 2 |
| 12 | 6 | 3 | 70 | 2 | 2 |
| 13 | 6 | 3 | 70 | 1+ | 1.5 |

EXAMPLES 14–20 AND COMPARATIVE EXAMPLES A–G

In order to demonstrate compositions according to this invention have excellent performance on various textile substrates, and that furthermore the overall performance is equal to or better than trichloroethane based formulations, in Examples 14–20, the composition described in Example 5 was applied to various textile substrates set forth in Table V and tested as described in Examples 1–8. The results are set forth in Table Va. In Comparative Examples A–G, these substrates were treated with a fluorochemical urethane acrylate terpolymer which is the reaction product of
39 parts $C_8F_{17}SO_2N(CH_3)C_2H_4OCOCH=CH_2$,
19 parts

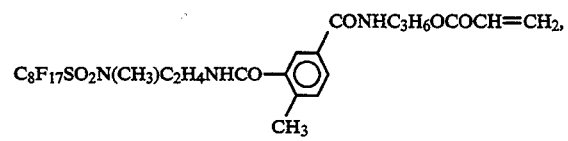

and
10 parts $C_4H_9OCOCH=CH_2$ and which is provided as 0.7% solids in 1,1,1-trichloroethane as in Example 14–20. The treated substrates were tested as in Examples 14–20. The results are set forth in Table Vb.

TABLE Va

| Ex. | Substrate | OR | WR | SR | AOR | ADS |
|---|---|---|---|---|---|---|
| 14 | Acrylic | 6 | 3 | 50 | 5 | 3 |
| 15 | Polyester | 6 | 3 | 50 | 6 | 3.5 |
| 16 | Viscose | 6 | 3 | 70 | 5 | 3.5 |
| 17 | Polyester/cotton | 6 | 4+ | 50 | 2 | 3 |
| 18 | Viscose/cotton | 5 | 3 | 70 | 2 | 2 |
| 19 | Gobelin I | 5 | 4 | 70 | 3 | 2.5 |
| 20 | Gobelin II | 5 | 4 | 70 | 4 | 3.5 |

TABLE Vb

| Comp. Ex. | Substrate | OR | WR | SR | AOR | ADS |
|---|---|---|---|---|---|---|
| A | Acrylic | 5 | 5 | 75 | 5 | 3 |
| B | Polyester | 4 | 7 | 70 | 3 | 2 |
| C | Viscose | 5 | 6 | 75 | 4 | 2 |
| D | Polyester/cotton | 2 | 3 | 50 | 0 | 1 |
| E | Viscose/cotton | 4 | 10 | 70 | 3 | 2 |
| F | Gobelin I | 4 | 5 | 70 | 3 | 2.5 |
| G | Gobelin II | 3 | 4 | 75 | 1 | 2 |

Examples 21–30 and Comparative Examples H–Q

Besides oil-, water-, and dry soil repellency, an important feature of an upholstery treatment is its "Stain Release" characteristics. In case a treated upholstery fabric gets stained, it is a major advantage if the stain can be removed easily.

In order to evaluate the stain release properties, in Examples 21–30, 10 different upholstery fabrics were treated with the composition Example No. 5 (see table 1) as in Examples 1–8. These treated fabrics were then stained with 13 different stains of different classes: oily-, aqueous-, and viscous staining agents. The stain release results are set forth in Tables VIa and VIb.

In Comparative Examples H–Q, the untreated fabric were evaluated for stain release. The results are set forth in Tables VIIa and VIIb.

TABLE VIa

| | Example | | | | |
|---|---|---|---|---|---|
| | 21 | 22 | 23 | 24 | 25 |
| | Fabric | | | | |
| Stain: | Cotton pile | Cotton flat | Acrylic | Polyester | Viscose |
| Wine | 8 | 7 | 7 | 8 | 8 |
| Coffee | 8 | 8 | 8 | 8 | 7.5 |
| Thee | 8 | 8 | 8 | 8 | 6.5 |
| Juice | 8 | 8 | 8 | 8 | 8 |
| Cola | 8 | 8 | 8 | 8 | 8 |
| Kool aid | 8 | 7 | 7 | 8 | 6 |
| Butter | 7.5 | 7 | 7 | 6 | 7 |
| Mayonnaise | 7.5 | 6 | 8 | 8 | 8 |
| DMO | 8 | 6 | 8 | 6 | 7 |
| Mustard | 8 | 7 | 7 | 8 | 6 |
| Ketchup | 8 | 8 | 8 | 8 | 8 |
| Curry | 6 | 3 | 6 | 8 | 3 |
| Chocolate | 8 | | 7 | 8 | 8 |

TABLE VIb

| | Example | | | | |
|---|---|---|---|---|---|
| | 26 | 27 | 28 | 29 | 30 |
| | Fabric | | | | |
| Stain: | Cotton/ acrylic | Cotton/ polyester | Cotton/ viscose | Gobelin I | Gobelin II |
| Wine | 6 | 8 | 4 | 8 | 8 |
| Coffee | 7 | 7 | 4 | 8 | 8 |
| Thee | 7 | 8 | 7 | 8 | 6 |
| Juice | 8 | 8 | 7 | 8 | 8 |
| Cola | 8 | 8 | 7 | 8 | 8 |
| Kool aid | 7 | 8 | 5 | 7 | 8 |
| Butter | 8 | 7 | 8 | 8 | 6.5 |
| Mayonnaise | 8 | 7 | 8 | 8 | 8 |
| DMO | 6 | 4 | 3 | 6 | 3 |
| Mustard | 8 | 7 | 8 | 8 | 7.5 |
| Ketchup | 8 | 7 | 8 | 8 | 8 |
| Curry | 8 | 6 | 2 | 5 | 6 |
| Chocolate | 8 | 7 | 7 | 8 | 7 |

TABLE VIIa

| | Example | | | | |
|---|---|---|---|---|---|
| | H | I | J | K | L |
| | Fabric | | | | |
| Stain: | Cotton pile | Cotton flat | Acrylic | Polyester | Viscose |
| Wine | 5 | 3 | 3 | 6 | 2 |
| Coffee | 6 | 6 | 3 | 8 | 4 |
| Thee | 6 | 4 | 5 | 8 | 3.5 |
| Juice | 6 | 8 | 4 | 8 | 7 |
| Cola | 8 | 8 | 7 | 8 | 7 |
| Kool aid | 7 | 3 | 6 | 7 | 1 |
| Butter | 6 | 7 | 7 | 7 | 3 |
| Mayonnaise | 6 | 8 | 8 | 8 | 7 |
| DMO | 3 | 2 | 2 | 3 | 1 |
| Mustard | 3 | 3 | 3 | 7 | 4 |
| Ketchup | 3 | 4 | 4 | 8 | 6 |
| Curry | 2 | 2 | 2 | 5 | 1 |
| Chocolate | 2 | | 3 | 5 | 5 |

TABLE VIIb

| Stain: | M Cotton/ acrylic | N Cotton/ polyester | O Cotton/ viscose | P Gobelin I | Q Gobelin II |
|---|---|---|---|---|---|
| Wine | 6 | 1 | 4 | 7 | 6 |
| Coffee | 7 | 4 | 4 | 7 | 8 |
| Thee | 8 | 1 | 7 | 8 | 6 |
| Juice | 8 | 8 | 7 | 8 | 6 |
| Cola | 8 | 7 | 7 | 8 | 8 |
| Kool aid | 6 | 7 | 5 | 6 | 8 |
| Butter | 6 | 1 | 8 | 6 | 6 |
| Mayonnaise | 8 | 6 | 8 | 8 | 7 |
| DMO | 2 | 1 | 3 | 2 | 3 |
| Mustard | 3 | 6 | 8 | 3 | 7 |
| Ketchup | 3 | 7 | 8 | 3 | 8 |
| Curry | 2 | 4 | 2 | 2 | 3 |
| Chocolate | 2 | 3 | 7 | 5 | 3 |

EXAMPLE 31 AND COMPARATIVE EXAMPLES R-S

The compositions according to the present invention were also tested under normal foot traffic in a controlled test area. In Table VIII the "Walk on" results of wool fabric (520 g/m²) treated with a composition according to this invention without anti-soil resin (Comparative Example R) fabrics without any treatment (Comparative Example S).

TABLE VIII

| Example | Treatment composition | WOS |
|---|---|---|
| 31 | 5.8 Component A<br>5 Component B<br>25 PM<br>10 PnB<br>54.2 water | 5 |
| R | 8.3 Component A<br>25 PM<br>10 PnB<br>56.7 water | 3–4 |
| S | no treatment | 3 |

A dry soil rating of 5 indicates that there is no increase in soiling versus a fabric which was not subjected to foot traffic.

EXAMPLE 32 AND COMPARATIVE EXAMPLES T-U

Cotton-flat, cotton-pile and wool fabrics were treated and tested as in Examples 1–8 using the composition of Example 6 of this invention (Example 32) and Example 10 of U.S. Pat. No. 4,681,790 (Fong) (Comparative Example T). For Comparative Example U, the fabrics were untreated. The results of the cotton-flat, cotton-pile and wool are set forth in Tables IXa, IXb and IXc, respectively.

TABLE IXa

| | (Cotton-flat) | | | | |
|---|---|---|---|---|---|
| Example | OR | WR | SR | AOR | ADS |
| T | 3 | 0 | 0 | 1 | 3 |
| 32 | 6 | 8 | 50 | 5 | 4 |
| U | 0 | 0 | 0 | 0 | 2 |

TABLE IXb

| | (Cotton-pile) | | | | |
|---|---|---|---|---|---|
| Example | OR | WR | SR | AOR | ADS |
| T | 2 | 1+ | 50 | 1 | 3 |
| 32 | 5 | 4 | 70 | 4 | 3 |
| U | 0 | 0 | 0 | 0 | 2 |

TABLE IXc

| | (Wool) | | | | |
|---|---|---|---|---|---|
| Example | OR | WR | SR | AOR | ADS |
| T | 3 | 3 | 70 | 3 | 1 |
| 32 | 6 | 3 | 70 | 5 | 2 |
| U | 0 | 0 | 0 | 0 | 1 |

From Tables IXa, IXb and IXc, it can be seen that the composition according to the invention has a better performance on cotton and wool textiles than the composition of U.S. Pat. No. 4,681,790.

EXAMPLES 33 AND 34

Commercially available fluorochemical polyoxyalkylene compounds were evaluated in compositions of the present invention as set forth in Table X.

TABLE X

| Ex. No. | Component A fluorochemical polyoxyalkylene | Component B anti-soil resin | Organic solvent | Water |
|---|---|---|---|---|
| 33 | 5.8 Zonyl 7910* | 5 | 25 BC | 64.2 |
| 34 | 5.8 AG-780** | 5 | 50 PnP | 39.2 |

*Zonyl 7910 is a fluorochemical polyurethane comprising polyoxyalkylene moieties (available from Du Pont).
**AG-780 is a fluoroaliphatic radical containing polyoxyalkylene compound according to U.S. Pat. No. 3,920,614 (available from Asahi Glass).

The compositions were applied to fabrics and tested as described in Examples 1–8. The results are set forth in Tables XIa, XIb and XIc.

TABLE XIa

| | (Cotton-flat) | | | | |
|---|---|---|---|---|---|
| Example | OR | WR | SR | AOR | ADS |
| 33 | 2 | 3 | 50 | 2 | 4 |
| 34 | 5 | 2 | 0 | 4 | 3 |

TABLE XIb

| | (Cotton-pile) | | | | |
|---|---|---|---|---|---|
| Example | OR | WR | SR | AOR | ADS |
| 33 | 1 | 1 | 50 | 0 | 3 |
| 34 | 4 | 2 | 70 | 3 | 3 |

TABLE XIc

| | (Wool) | | | | |
|---|---|---|---|---|---|
| Example | OR | WR | SR | AOR | ADS |
| 33 | 7 | 2 | 70 | 4 | 3 |
| 34 | 6 | 2 | 70 | 4 | 3 |

Various modifications and alterations of this invention will become apparent to those skilled in the art without departing from the scope of this invention.

We claim:

1. A process for providing a fibrous substrate with water- and oil-repellency, stain resistance and dry soil resistance comprising the steps of (a) contacting said fibrous substrate which is a textile fiber or filament, or a finished or fabricated fibrous article, with an aqueous treating solution comprising
- a) 0.3 to 30% by weight of a water soluble or dispersible fluoroaliphatic radical-containing poly(oxyalkylene) compound, or a composition comprising a mixture or such poly(oxyalkylene) compounds having one or more monovalent fluoroaliphatic radicals and one or more poly(oxyalkylene) moieties, said fluoroaliphatic radicals and poly(oxyalkylene) moieties being bonded together by hetero atom-containing groups or organic linking groups or combinations of such groups;
- b) 0.3 to 30% by weight of solid, non-tacky, water-soluble or water dispersible anti-soiling agent which is a brittle polymeric resin, colloidal alumina or colloidal silica and which, upon drying of the composition at ambient temperature, is capable of rendering the substrate non-tacky and resistant to soiling; and
- c) water, with the proviso that the ratio of component (a) to component (b) be 1:20 to 20:1.

by spraying, dipping, coating, padding, foam or roller coating application or a combination thereof and (b) allowing the treated substrate to dry at ambient temperature.

2. The process of claim 1 wherein the treating composition further comprises 60% by weight of at least one environmentally acceptable water-missible organic solvent.

3. The process of claim 1 wherein the fluoroaliphatic radical containing poly(oxyalkylene) compound of the treating composition has the general formula:

$(R_f)_s Z[(R^3)_y Z'B]_t$   II $[(R_f)_s Z[(R^3)_y Z'B]_t]_w$   III where
$R_F$ is a fluoroaliphatic radical,
Z is a linkage through which $R_f$ and $(R^3)_y$ moieties are covalently bonded together,
$(R^3)_y$ is a poly(oxyalkylene) moiety, $R^3$ being an oxyalkylene group with 2 to 4 carbon atoms and y is an integer where the above formulas are those of individual compounds or a number where the above formulas are those of mixtures at least 4.

B is a hydrogen atom or a monovalent terminal organic radical,
B' is B or a valence bond, with the proviso that at least B' is a valence bond interconnecting a Z-bonded $R^3$ radical to another Z,
Z' is a linkage through which B, or B', and $R^3$ are covalently bonded together,
s is an integer or number of at least 1 and can be as high as 25 or higher,
t is an integer or number of at least 1, and can be as high as 60 or higher, and
w is an integer or number greater than 1, and can be as high as 30 or higher.

4. The process of claim 1 wherein the fluoroaliphatic radical containing poly(oxyalkylene) compound of the treating composition contains a fluoroalkyl radical having from 3 to 20 carbon atoms.

5. The process of claim 1 wherein the poly(oxyalkylene) compound of the treating composition contains 4 to 180 ethylene or propylene radicals or combinations thereof.

6. The process of claim 1 wherein said poly(oxyalkylene) compound of the treating composition is a copolymer of
(a) $C_8F_{17}SO_2N(CH_3)C_2H_4OCOCH=CH_2$
(b) $CH_2=C(CH_3)COO(CH_2CH_2O)_{90}H$ and
(c) $CH_2=C(CH_3)COO(CH_2CH_2O)_{90}COC(CH_3)=CH_2$ 7. The process of claim 6 wherein the weight ratio a:(b+c) is 1:1, b:c is 3:1.

8. The process of claim 2 wherein the water-miscible organic solvent is an alcohol, a water-miscible ether, a glycol ether, a lower ester of monoalkyl ether, of ethylene glycol or of propylene glycol, and mixtures thereof.

9. The process of claim 11 wherein the brittle polymeric resins include styrene-malaic anhydride copolymers and salts thereof, polyvinyl- pyrrolidone, polyacrylate/acrylic acid copolymers, vinyl acetate/maleic anhydride copolymers, carboxymethylcellulose, carboxyl-containing resins and water soluble melamine-formaldehyde condensates.

10. The process of claim 1 wherein said substrate is a textile fabric, carpet, paper or leather.

11. A treated fibrous substrate having water- and oil-repellency, stain resistance and dry soil resistance treated according to the process of claim 1 wherein said fibrous substrate is a textile fiber or filament, or a finished or fabricated fibrous article.

* * * * *

UNITED STATES PATENT AND TRADEMARK OFFICE
CERTIFICATE OF CORRECTION

PATENT NO. : 5,370,919
DATED : December 6, 1994
INVENTOR(S) : Franceska Fieuws, Kathy Allewaert and Dirk Coppens It is certified that error appears in the above-indentified patent and that said Letters Patent is hereby corrected as shown below:

| | |
|---|---|
| Col. 4, line 21 | Insert -- Z -- at begining of line before the word "is" |
| Col. 7, line 5 | "Company brittle" should read -- Company), brittle -- |
| Col. 8, line 4 | "3,5-dimethyl-i-hexyene-3-ol" should read -- 3,5-dimethyl-1-hexyene-3-ol -- |
| Col. 17, line 6 | "or" should read -- of -- |
| Col. 17, lines 37-39 | Insert "or" between the two formulas |
| Col. 17, line 42 | "$R_F$" should read -- $R_f$ -- |
| Col. 18, line 35 | "claim 11" should read -- claim 1 -- |
| Col. 18, line 35 | "styrene-malaic" should read -- styrene-maleic -- |

Signed and Sealed this

Twenty-seventh Day of June, 1995

Attest:

BRUCE LEHMAN

Attesting Officer     Commissioner of Patents and Trademarks